United States Patent [19]

Pieper

[11] 4,169,963
[45] Oct. 2, 1979

[54] ELECTRICALLY HEATED MELTING FURNACE FOR MINERAL MATERIALS

[75] Inventor: Helmut Pieper, Lohr, Fed. Rep. of Germany

[73] Assignee: Sorg GmbH & Co. KG, Pflochsbach bei Lohr a. Main, Fed. Rep. of Germany

[21] Appl. No.: 899,665

[22] Filed: Apr. 24, 1978

[30] Foreign Application Priority Data

Nov. 24, 1977 [DE] Fed. Rep. of Germany ....... 2752467

[51] Int. Cl.² .............................................. C03B 5/02
[52] U.S. Cl. ........................................................ 13/6
[58] Field of Search ....................................... 13/6, 23

[56] References Cited

U.S. PATENT DOCUMENTS

| | | | |
|---|---|---|---|
| 2,413,037 | 12/1946 | DeVoe | 13/6 |
| 3,097,251 | 7/1963 | Gell | 13/6 |

*Primary Examiner*—R. N. Envall, Jr.
*Attorney, Agent, or Firm*—Sprung, Felfe, Horn, Lynch & Kramer

[57] ABSTRACT

An electrically heated melting furnace for the melting of mineral materials, such as frits, (vitreous) enamels and the like, wherein a bath of molten material contained in a tank is heated by means of electrodes contacting the molten material and having a current flowing therethrough which heats the molten material by Joule's heat, wherein a batch is fed onto the melt or molten bath, and the molten product is withdrawn from the bottom of the tank wherein the furnace space or tank having the molten bath has a square or almost square cross-section or the cross-section of a regular polygon; that the depth of the furnace space or tank having the molten material therein corresponds almost to the diameter of the tank; and that a plurality of radiator heating rods are arranged above the batch material and said heating electrodes are positioned in the lower portion of the molten bath above the tank bottom and comprising a bottom outlet including a cylindrical portion or element and a further underlying, concentrically disposed, circular disc-shaped or annular portion or element of a refractory material being conductive at high temperature and acting as an electrical conductor, which elements are conductively coupled to a current supply line.

6 Claims, 3 Drawing Figures

ELECTRICALLY HEATED MELTING FURNACE FOR MINERAL MATERIALS

BACKGROUND

The present invention relates to an electrically heated melting furnace for the melting of mineral materials, such as frits, (vitreous) enamels and the like, wherein a bath of molten material contained in a tank is heated by means of electrodes contacting the molten material and having a current flowing therethrough which heats the molten material by Joule's heat, wherein a batch is fed onto the melt or molten bath, and the molten product is withdrawn from the bottom of the tank.

Furnaces are known for the melting of mineral materials and especially frits, (vitreous) enamels and the like, wherein the conventional, shallow bath of molten material is heated from above by the heat produced by gas or oil burners, and wherein the molten mass is withdrawn either directly through the bottom or through a lateral outlet including a riser and feeder. However, these conventional furnaces suffer from the drawback of releasing great quantities of emission to the environment, which emission includes particularly the exhaust gases of the burners and the, in part toxic, gases released from the batch. Further, it is advantageous in these furnaces that their volume is required to be large as compared to the capacity thereof, such that these furnaces are expensive to construct and such that their efficiency is low; this means that a great energy demand per unit of weight of molten material is unavoidable.

Still further, a furnace developed by the applicant is known, which furnace in addition to the conventional mode of heating by oil or gas burners, is also provided with a heating system in the form of electrodes immersed into the molten material; in an further development, such furnace may be operated with high efficiency. However, it is still of disadvantage in this prior furnace that a relatively shallow tank containing molten material is present in which the surface losses are not kept at the desired minimum level. The construction of this furnace is still relatively expensive. On the other hand, it is advantageous in this prior furnace as compared to the "conventional" furnaces that, owing to the electric heating, a smaller quantity of exhaust gas is released by the burners, and that all of the exhaust gas produced during the melting of the batch may be collected totally and, optionally upon cleaning and detoxication, released to the atmosphere. However, this necessitates an extremely high degree of expenditure.

In view of this, it is the object of the present invention to provide a melting furnace particularly for frits, enamels and other mineral materials, which does no longer suffer from the abovementioned drawbacks and which offers optimum efficiency, substantially the theoretical efficiency, with respect to consumption of thermal energy.

Furthermore, the furnace according to the present invention should be inexpensive, of compact and small-size construction, while nevertheless offering an extremely high capacity, namely an extremely high rate of throughput. Operation of this furnace should be controllable without difficulty and in easy manner, and the quality of the molten materials should be improved as compared to the quality obtained by conventional furnaces. The advantages of the complete withdrawal and removal of the exhaust gases should be retained, and, in particular, the flow through the outlets should lend itself to be controlled by most simple means independently of the level of the surface of the molten glass bath. Still further, the furnace according to the invention including the components thereof should have a long operational life, and reconstruction of the furnace should be possible readily and in a short period of time.

According to the present invention, this object is solved in that the furnace space or tank having the molten bath has a square or almost square cross-section or the cross-section of a regular polygon; that the depth of the furnace space or tank having the molten material therein corresponds almost to the diameter of the tank; and that a plurality of radiator heating rods are arranged above the batch material and said heating electrodes are positioned in the lower portion of the molten bath above the tank bottom.

In order to facilitate the outflow, the furnace is of such construction that said bath includes a lateral outlet to which a riser followed by a feeder are connected, with the bottom of said riser and/or of said feeder each being provided with a bottom outlet.

In particular, for the control of the required temperature of the outflowing material and expecially for the control of the quantity discharged per unit of time, the bottom outlet is formed in such a manner that it includes a cylindrical portion or element and a further underlying, concetrically disposed, circular disc-shaped or annular portion or element of a refractory material being conductive at high temperature and acting as an electrical conductor, which elements are conductively coupled to a current supply line.

In order that the required temperature of the refractory materials can be controlled, that these materials can be supported or retained and in order to provide for tightness of the outlet and, further, to control the fritting of the outflowing materials within the outlet, this bottom outlet may be characterized by the fact that the current disc-shaped element is retained in an metallic annular element and supported by the bottom plate thereof; that an annular cooling passage is provided below said bottom plate; that said bottom plate has a center aperture including a bell-shaped extension in the region of said annular cooling passage; and that radial channels or passages for the coolant extend from said annular cooling passage into the bell-shaped extended portion of said center aperture.

In order to provide for versatile cooling and thereby to allow for adequate cooling also of the edge portions of the outlet and of the adjacently disposed refractory materials which need not be (electrically) conductive, beneath the bottom plate and adjacent the edge thereof there is provided another annular cooling water passage, and for the insulation against the cooler ambient air as well as for obtaining a particularly compact structure, both the circular disc, the mounting means thereof, said annular cooling passage and said annular cooling water passage are provided within a aperture in the refractory material of the tank bottom.

In order to obtain a defined outflow, and in order to improve the electrical (current) paths within the outflowing material, preferably the center aperture of said cylindrical portion is of substantially greater diameter than the center aperture of said circular disc-shaped element or portion, while, in order to avoid excessive heating of the adjacent material and to confine the current paths to the associated region within the refractory material, it is preferable that the cylindrical portion is inserted into a hole or aperture defined by refractory material being non-conductive or of substantially lesser conductivity than the material of said cylindrical portion.

In view of the sum of the advantages that may be achieved by the invention, particularly of the control being substantially improved as compared to the conventional furnaces, of the improved efficiency and of the improved quality of material, it may be spoken of an ideal solution to the existing problems by the subject matter of the invention. Below, an exemplary embodiment of the invention is explained in greater detail by referring to the enclosed drawings, wherein.

As shown in the FIGS., the furnace according to the invention is formed of conventional, customary refractory material 18 defining a bottom, the sidewalls, a roof and the other elements of the furnace as are well known in furnace construction. The furnace is completed by a not illustrated supporting frame as well as by a feeding or charging device, a gas exhaust and the like. As these portions do not form part of the present invention but are subject to the expert's choice, any further description of these components may be dispensed with.

The furnace proper contains a tank 30 with molten material to which a mixture or batch is fed from above and which has a rectangular, particularly square, or regularly polygonal cross-section, with the height of the bath of the molten material corresponding approximately to the diameter thereof or, in the case of a square cross-section, to the length of one side of the square. Apparently, a configuration most closely resembling that of a ball or sphere has been selected in order to reduce the heat releasing surface area.

Figure 1:
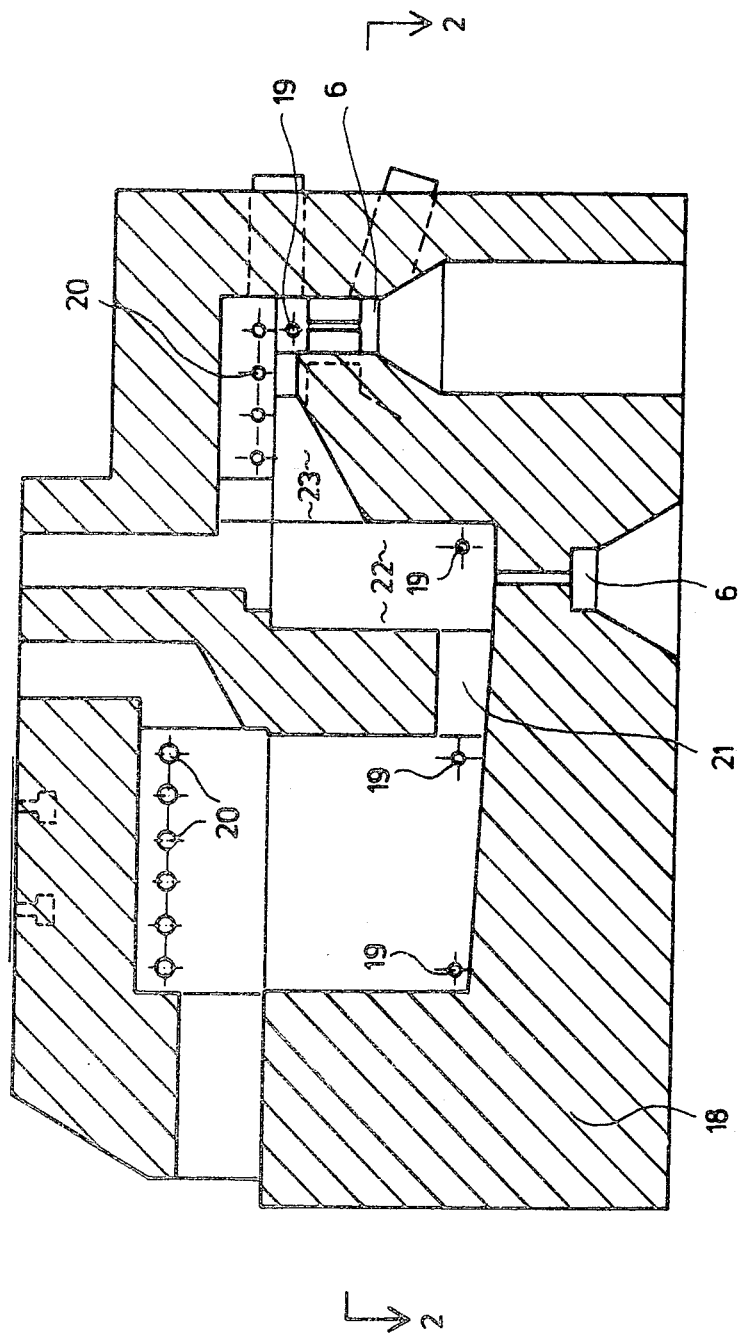
FIG. 1 shows a schematical longitudinal sectional view of the furnace according to the invention.
Figure 2:
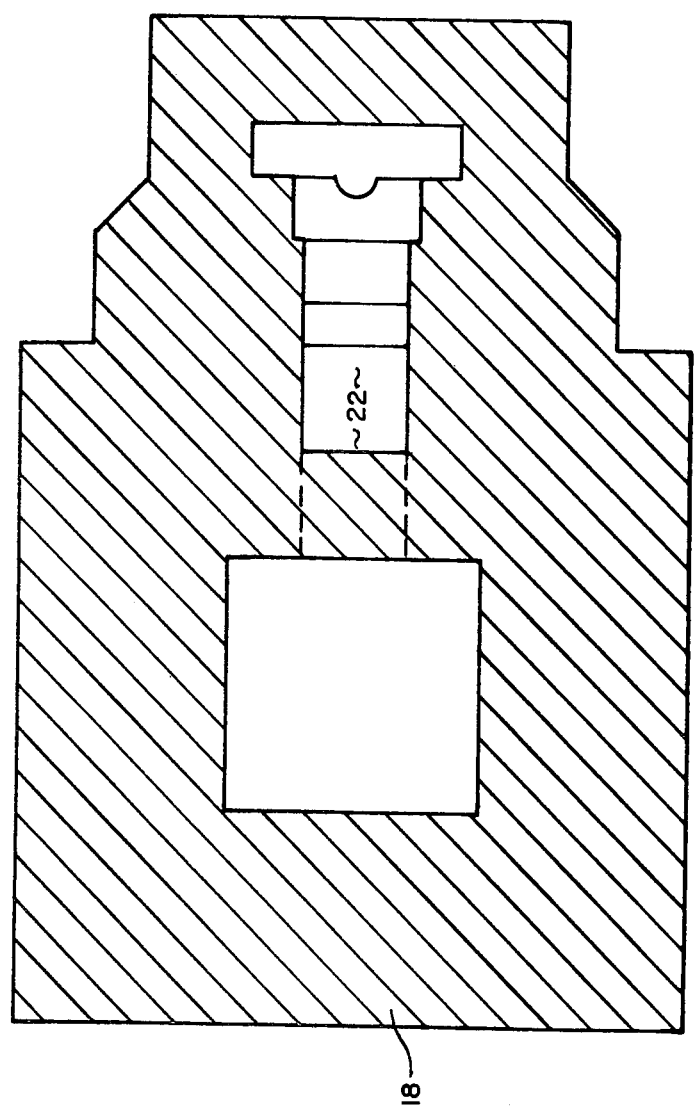
FIG. 2 is a horizontal sectional view along lines II—II in FIG. 1.

The lower portion of the furnace has mounted therein a bottom outlet 6 which may be installed either directly below the molten bath or connected thereto through a lateral outlet 21 and installed into the bottom of a riser 22. In the embodiment according to FIG. 1, another bottom outlet 6' is provided in the bottom of a feeder 23 joining the riser 22 in the well-known manner.

Radiator heating rods 20 are positioned above the batch, and heating rods 20' are also provided above the free surface of the molten bath pool (tank) within the feeder 23. Interiorly of the tank, especially slightly above the bottom of the furnace, heater electrodes 19 are provided, similar electrodes 19' being present also in the riser 22 and the feeder 23 and cooperating with corresponding conductive surfaces provided within the bottom outlets, 6,6'. In a conventional manner, the electrodes are connected to the electric mains through electrode holders, supply lines or cables and regulating transformers. These components, including the electrodes, which may be formed of molybdenum or, optionally, stannous oxide, likewise belong to the prior art and are subject to the expert's choice such that these components need not be explained in any greater detail. The bottom outlets provided in the bottom of the furnace or of the riser as well as of the feeder, generally indicated at 6,6', are formed both of metallic material, e.g. "Inconel", and melt-cast refractory material having a vetreous phase and therefore being conductive at high temperatures, even if with a high electric resistance, or of materials of comparable properties.

Figure 3:
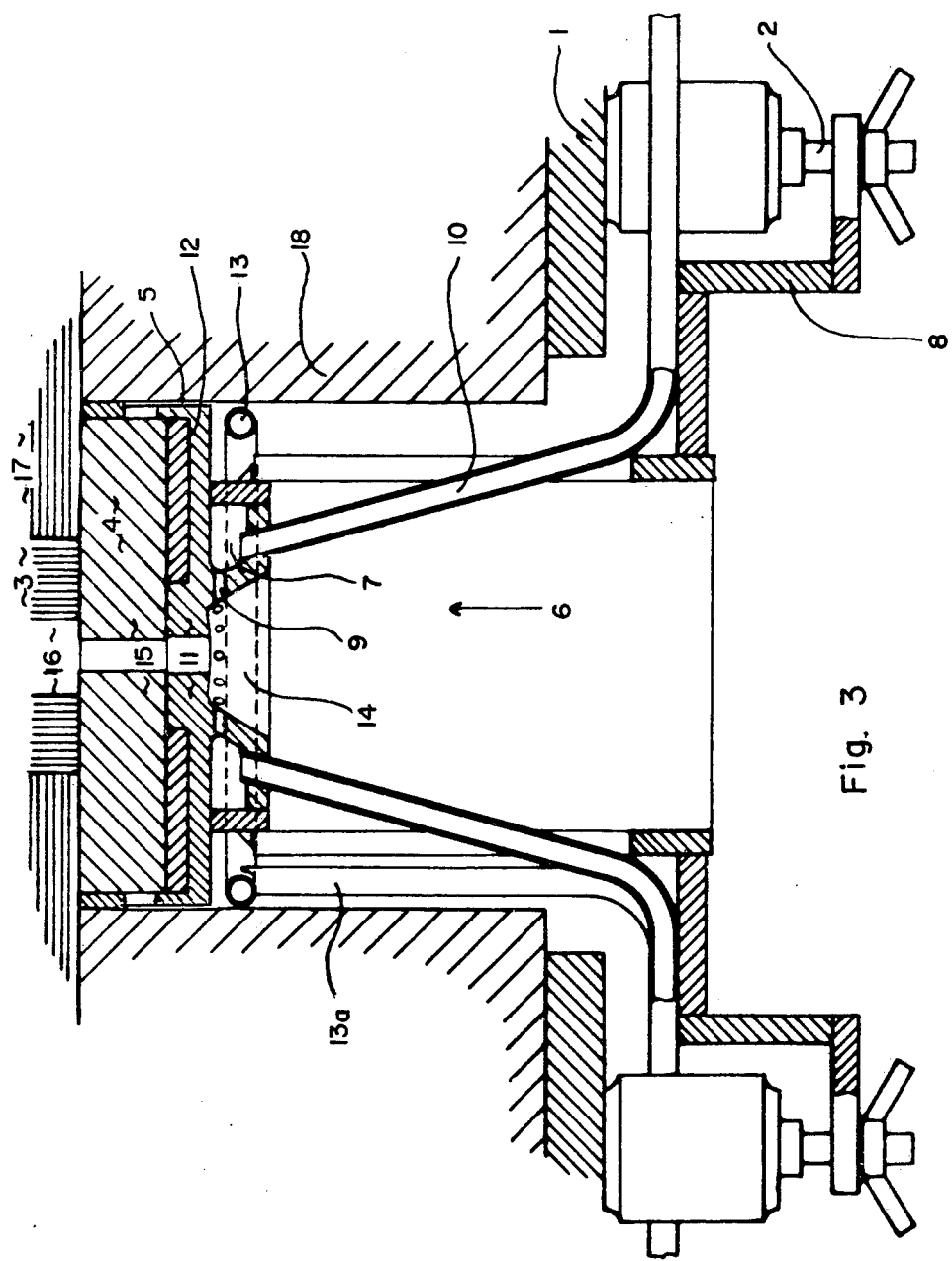
FIG. 3 is a vertical sectional view of a bottom outlet according to the present invention.

As shown in FIG. 3, the bottom outlet 6,6', according to the invention comprises a cylindrical portion 3 or element having a center aperture 16, and an underlying circular ring-shaped or annular disc-shaped portion or element 4 having a center aperture 15, both elements being formed of melt-cast refractory material and being retained in an annular element 5 made of Inconel, platinum, stainless steel or other suitable material.

Annular element 5 receives or embraces the lower edge of element 4 the bottom face of which rests on a bottom plate 12 of annular element 5. This bottom plate 12 is provided with a center aperture or bore 11 the cross-sectional area of which is slightly greater than that of the center aperture 15 of element 4 which, in turn, is substantially smaller than the center aperture 16 of element 3.

Below the bottom plate 12, the wall of an annular cooling passage 7 is integrally secured or welded to said bottom plate, and adapted to be fed with a coolant through cooling channels 10. Radial bores 9 extend from the annular cooling passage 7 to a bell-shaped extension 14 of center aperture 11.

Below the bottom plate 12 and adjacent to the outer edge thereof, another annular passage 13 for cooling water is provided, which passage may be supplied with cooling water or a different coolant via further cooling poipes 13a.

Both the bottom plate 12 including the annular element 5 and the underlying annular cooling passage 7 and, thus, also elements 3 and 4, as well as the annular cooling water passage 13 are supported by a supporting frame 8 being mounted to the bottom plate 1 through anchor elements 2 and adjustable by means of wing bolts 2'.

Cylindrical portion or element 3 is embedded into the refractory material of the furnace bottom, said material having a substantially lower electrical conductivity than the material of elements 3 and 4. The outlet as such is mounted in an aperture of the refractory material 18 of the furnace bottom or of the feeder bottom, and a not illustrated supply line and press-fitted electrodes connect the annular or circular element 4 to a power source.

The bottom outlet according to the invention allows current to flow through elements 3 and 4 towards the exiting flow of molten material such that the temperature of the latter is in this way adapted to be controlled as desired. By means of the temperature, furthermore the visocity and, thus, the rate of discharge of this flow are adjustable such that the discharge quantity may be controlled independently of the level of the molten material bath. Upon stopping the discharge, it is further possible to prevent complete "freezing", i.e. a temperature reduction to such extent that current can no longer flow through the material of the melt, by continuing to maintain a small current flow. Thus, upon restarting it is only necessary to increase the amount of current flowing through the material, whereby the outlet will be opened automatically. It is surprising to the expert that the current flow through elements 3 and 4 acting as conductors, does not exclusively result in heating of the outlet, but also allows to control the outlet up to full blocking thereof. It is self-evident to the expert that a counter electrode is provided above or adjacent the outlet within the mass of molten material contained in the tank, such that the desired current flow through elements 3 and 4 and through the molten material existing within center apertures 15 and 16 may take place.

The material exiting from radial bores or apertures 9 is contacted with a cooling medium, such as air or water, and thereby cooled to the required temperature. At the same time, the structure of the outlet is cooled. In order to provide for cooling also at the outer edges of the outlet, the quantity of coolant within the annular cooling water passage 13 is variable such that any desired temperature gradient may be set across the radius of the outlet. In addition, any undesirable flow of molten material into the interfaces between the refractory material 18, the annular element 5 and the refractory material 17 is positively prevented by the annular cooling water passage. This feature is of particular importance because splitting failure of the refractory elements due to alternating thermal stresses cannot be excluded, while such splitting can be controlled by corresponding temperature adjustment or by setting of the temperature gradient in the radial direction and also axially in the direction of discharge, respectively. Of particular advantage is the fact that an absolutely symmetrical energy supply to the outflowing stream of molten material takes place interiorly of the outlet, and that a perfectly symmetrical current flow within such stream can be provided. Inhomogeneities of temperature are thereby avoided. Furthermore, it is decisive that the temperature of the material surrounding the stream of molten material may be controlled by the resistive heating taking place therein without requiring separate heater elements, such that heat losses are avoided and heating-up following the closing of the outlet is facilitated, too. In a manner being surprising to the expert, it has been found that a purely external heating system, e.g. by means of conductive electrode rings made of the conventional electrode materials, would not provide the aspired controllability.

Radiator heating tubes are provided above the batch of the molten material and, optionally, above the surface of the feeder, which elements on the one hand maintain the temperature homogeneity within the feeder, and on the other hand may heat up the batch material and keep a superstructure temperature that is necessary to avoid foaming which may happen with certain batches. These radiator heating tubes may be employed also for the initial starting melting of the batch material, until electrodes 19 may be put into operation.

I claim:

1. An electrically heated melting furnace for the melting of mineral materials, such as frits, enamels and the like, comprising: a tank receptive a bath of molten material contained therein and including a lateral outlet, a riser connected thereto and a feeder following the riser and wherein the bottom of at least one of said riser and said feeder has a bottom outlet in communication therewith comprising a cylindrical element and a further underlying, concentrically disposed, circular disc-shaped element of a refractory material being conductive at high temperature and acting as an electrical conductor, which elements are conductively coupled to a current supply line; means for heating the material in the tank comprising electrodes contacting the molten material and having a current flowing therethrough which heats the molten material by Joule's heat; means for feeding a batch onto the molten bath; means for withdrawing the molten product from the bottom of the tank; wherein the tank has the cross-section of a substantially regular polygon and the depth of the tank corresponds approximately to the diameter of the tank; and a plurality of radiator heating rods arranged above the batch material and wherein said heating electrodes are positioned in the lower portion of the molten bath above the tank bottom.

2. The melting furnace according to claim 1, wherein said bottom outlet further includes means mounting said circular disc-shaped element comprising a metallic annular element on which the circular element is retained, a bottom plate in the annular element on which the circular element is supported, an annular cooling passage provided below said bottom plate, wherein said bottom plate has a center aperture including a bell-shaped extension in the region of said annular cooling passage and radial passages for the coolant extending from said annular cooling passage into the bell-shaped extended portion of said center aperture.

3. The melting furnace according to claim 2, wherein an annular cooling water passage is provided below said bottom plate adjacent the edge thereof.

4. The melting furnace according to claim 3, wherein said circular disc, the mounting means same, said annular cooling passage and said annular cooling water passage are provided within an aperture in the refractory material of the tank bottom.

5. The melting furnace according to claim 4, wherein said cylindrical element and said circular elements have center apertures therein and wherein the center aperture of said cylindrical element is of a substantially greater diameter than the center aperture of said circular disc-shaped element.

6. The melting furnace according to claim 5, wherein said cylindrical element is inserted into an aperture defined by refractory material being at least of substantially lesser conductivity than the material of said cylindrical element.

* * * * *